United States Patent [19]
Bohan, Jr.

[11] Patent Number: 4,631,626
[45] Date of Patent: Dec. 23, 1986

[54] TEMPERATURE CONTROLLER WITH TEMPERATURE LIMITING SENSOR

[75] Inventor: John E. Bohan, Jr., Minneapolis, Minn.

[73] Assignee: Honeywell Inc., Minneapolis, Minn.

[21] Appl. No.: 780,787

[22] Filed: Sep. 27, 1985

[51] Int. Cl.⁴ .............................................. H02H 5/04
[52] U.S. Cl. .................................. 361/104; 361/178; 307/117; 340/590; 323/909
[58] Field of Search .................. 361/91, 88, 93, 103, 361/104, 178, 55; 307/326, 100, 116, 117, 118; 340/590, 612, 622, 650; 337/283; 323/909; 122/504.1, 504.3

[56] References Cited

U.S. PATENT DOCUMENTS

| | | | |
|---|---|---|---|
| 3,512,044 | 5/1970 | Jones | 361/55 |
| 3,727,105 | 4/1973 | Hochheiser | 361/55 |
| 3,729,656 | 4/1973 | Luquain | 361/104 |
| 3,944,845 | 3/1976 | Luteran | 307/118 |
| 4,103,319 | 7/1978 | Crain et al. | 361/106 |
| 4,361,274 | 11/1982 | Raleigh et al. | 236/21 |
| 4,484,243 | 11/1984 | Herbst et al. | 361/104 |
| 4,565,930 | 1/1986 | Bartels | 361/178 X |

Primary Examiner—A. D. Pellinen
Assistant Examiner—T. DeBoer
Attorney, Agent, or Firm—Clyde C. Blinn

[57] ABSTRACT

A temperature controller with a remote sensor having a high temperature cutoff with circuit means to prevent operation of the unit if tampered with to bypass a safety function. A remote sensor has a thermal fuse and diode feeding a pulsating D.C. voltage to a control circuit having a capacitor and an impedance means to which pulsating D.C. is fed. If the sensor unit is bypassed the thermal fuse in the controller burns out to render the controller inoperative.

6 Claims, 3 Drawing Figures

TEMPERATURE CONTROLLER WITH TEMPERATURE LIMITING SENSOR

BACKGROUND AND SUMMARY OF THE INVENTION

In temperature controllers for temperature conditioning apparatus such as a controller for controlling the operation of the burner of a boiler, a sensor unit is inserted into the water jacket of the boiler. The sensor unit has a temperature responsive element for controlling the operation of the heating apparatus and often a thermal fuse which would protect the boiler from reaching too high a temperature. When a malfunction of the controller takes place and the boiler water temperature increases to some extremely high limit, the thermal fuse melts to de-energize the controller and turn off the heating apparatus. Where such temperature controllers can be tampered with, or, due to manufacturing flaws, the safety thermal fuse of the sensor unit, which may have opened, can be shorted out or bypassed so that, upon an extremely high temperature in the boiler, the safety operation would not take place.

The present invention is concerned with a high limit safety circuit or high limit cutoff for the temperature controller which, when the safety temperature sensor or thermal fuse in the sensor unit is bypassed or shorted out, a malfunction or hazardous condition cannot take place by a continued operation of the heating apparatus. Specifically, the thermal fuse is connected in series with a diode to transform the power delivered to the controller to a pulsating DC. A capacitor in the input of the power circuit then has a high impedance and a low current value through a second thermal or current responsive fuse in the controller. If the thermal fuse circuit of the sensor is shorted to also short out the diode, a full-wave AC current is applied to the capacitor increasing the current level and exceeding the limit of the second thermal fuse causing the second thermal fuse to burn out and thus break the power supply circuit to the controller.

With such a safety circuit, a sealed sensor unit and a sealed controller is used. If the thermal fuse in the sensor unit becomes burned out, a shorting of the wires to the sensor unit to bypass the thermal fuse results in the burning out of the second thermal fuse in the controller requiring that a new sensor unit and controller be obtained.

DESCRIPTION OF THE PREFERRED EMBODIMENT OF THE INVENTION

Figure 1:
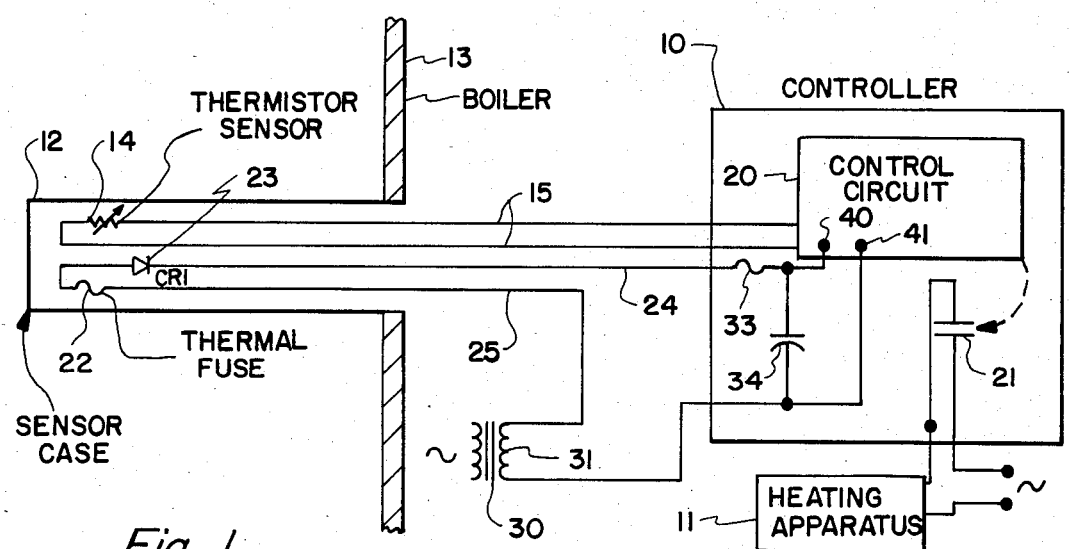
FIG. 1 is a schematic version of the controller and sensor unit.

Referring to FIG. 1, a controller or control panel 10 is adapted to control a temperature conditioning apparatus or heating apparatus such as a boiler 11 which supplies temperature conditioning medium or hot water to a space or house. Connected to controller 10 is a temperature sensing unit or sensor case 12 which is inserted into the water jacket of the boiler 13. Contained in sensor case 12 is a temperature responsive resistance element or thermistor sensor 14 connected by two wires 15 to a control circuit 20. Control circuit 20 controls the operation of a relay 21 connected to supply power to the heating apparatus 11.

Also contained in sensor case 12 is a thermal fuse or temperature responsive switch element or unit 22 which is set to open or melt at some high temperature considered as a maximum or high limit temperature of operation for the water in the boiler. Sensor case 12 may be sealed to prevent removal of the element or fuse. The thermal fuse or fusible element 22 is connected in a series circuit with a unidirectional current conducting device or diode 23 by two wires 24 and 25 which are part of a power supply circuit to control circuit 20. The power supply which may be in controller 10 has a source of power or transformer 30 providing a low voltage from winding 31.

Contained in the controller which also may be sealed to prevent anyone from tampering with the circuit or replacing any elements are a second thermal or current responsive fuse or temperature or current responsive switch element or unit 33 and a variable impedance means or capacitor 34 connected in a second series circuit. The secondary 31 of transformer 30 is connected to the two series circuits so that a unidirectional pulsating current flows from the winding 31 through the thermal fuse 22, diode 23, thermal fuse 33, capacitor 34 and back to the transformer winding. When powered with the pulsating DC current, capacitor 34 remains charged, drawing a small current to not open fuse 33, and the direct current voltage across the capacitor is used to power control circuit 20.

Figure 2:
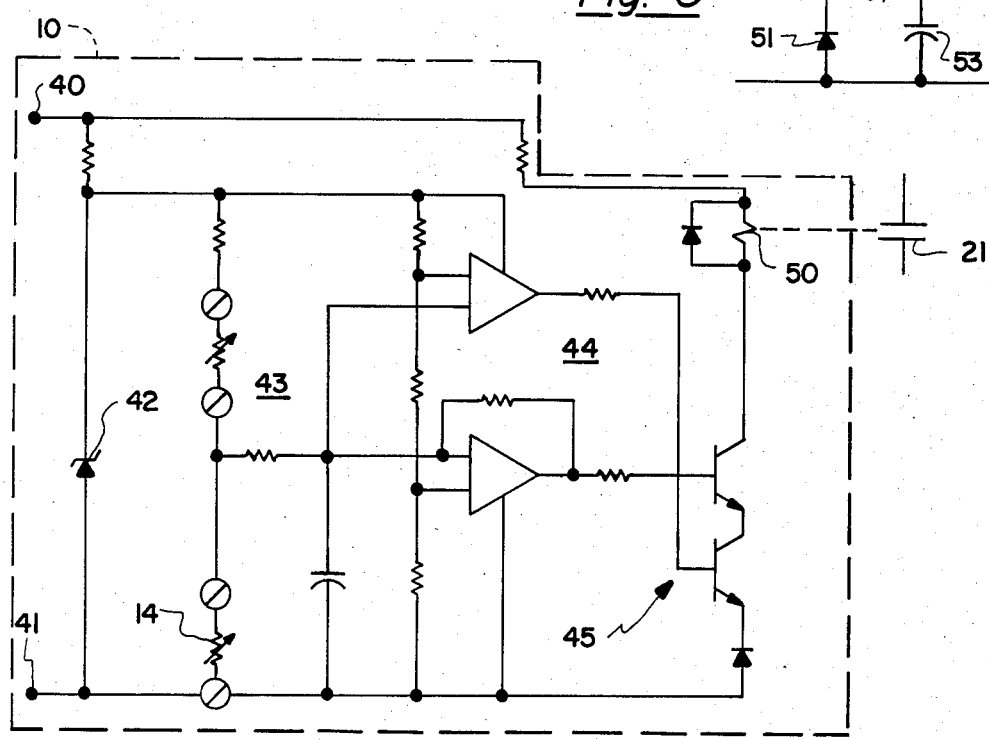
FIG. 2 is a specific circuit for a control circuit.

Control circuit 20 is shown specifically in FIG. 2 but as for this invention, any conventional control circuit may be used to which power is furnished by the voltage across capacitor 34. The output of the control circuit controls a relay such as 21 for operating the heating apparatus Referring to FIG. 2, the voltage across terminals 40 and 41 is filtered through the filtering circuit 42 to be supplied to bridge circuit 43. Bridge circuit 43 includes the temperature sensing element 14. The output of bridge circuit 43 when amplified through the amplification circuit 44 controls switches 45 to energize relay 50 which is connected to control the operation contacts 21.

OPERATION OF THE PREFERRED EMBODIMENT OF THE INVENTION

When controller 10 is installed to control heating apparatus 11 of a boiler, the internal portion of controller 10 may be sealed so that once thermal fuse 33 is melted or burned out, a replacement of the controller or portion thereof may be needed to provide an operative unit. The sensor unit or case 12 also may be a sealed unit which is screwed into the water jacket 13 of the boiler. Sensor 12 has four electrical output wires 15, 24 and 25 for connecting to the control circuit of controller 10. Sensor unit 12 is also a sealed unit so that once a thermal fuse melted a new sensor unit or case have to be obtained.

Upon the occurence of a high temperature to result in a melting and opening of the thermal fuse 22, no power would be delivered from transformer 30 to control circuit 20. In many cases the inoperative condition of the control circuit would be overcome by shorting out the thermal fuse or high limit. With the present invention, the shorting of wires 24 and 25 to take the series circuit including the thermal fuse and diode out of the circuit would not result in a restoration of the controller to a normal operation. The shorting out of diode 23 would then feed capacitor 34 with a full wave AC voltage and much higher current than heretofore with the pulsating DC, so that the higher current value would be beyond the operating capacity of the thermal fuse 33. The fuse would burn out to render the power supply inoperative.

DESCRIPTION AND OPERATION OF A SECOND EMBODIMENT OF THE INVENTION

Figure 3:
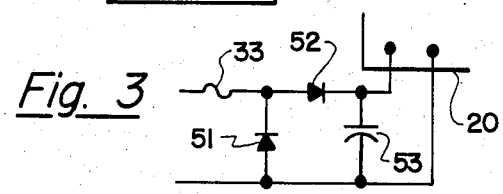
FIG. 3 is a second embodiment of the invention.

The input circuit of controller 10 may be as shown in FIG. 3. Two unidirectional current conducting devices or diode 51 and 52 and a capacitance 53 are used to provide a variable impedance input circuit to controller 10 instead of capacitance 34 as shown in FIG. 1.

Normally a low current would flow through unit 33 as current would flow in one direction through diode 23. If sensor 12 were shorted across wires 24 and 25, a higher current would flow through unit 33, first through diode 51, then diode 52 on the opposite cycles of the AC power. This would melt element 33 to drop the voltage across capacitance 53 to zero.

With such temperature controllers, the product liability is of great importance and a tampering in the field of a sensor unit to cut out the high limit can result in a serious outcome. With the present invention the thermal fuse of control circuit 10 burns out and since the thermal fuse 33 is not readily replaceable, operation of the controller would not be restored. The owner of the building would then call a capable serviceman who in this particular case would recognize controller 10 as well as sensor unit 12 would have to be replaced once the abnormal condition took place or an attempt to defeat the controller were made.

The embodiments of the invention in which an exclusive property or right is claimed are defined as follows:

1. In a temperature limiting circuit for a sensor and controller comprising,
   a remote sensor comprising temperature responsive switch means providing an open circuit at a predetermined temperature and a unidirectional current conducting means connected in series to two output terminals,
   a temperature controller having a two terminal power input circuit, comprising a current responsive switch means opening at a predetermined current connected to a first of said two terminals and a capacitance connected between said current responsive switch means and a second of said two terminals,
   a source of alternating current power, and
   circuit means including said two output terminals of said remote sensor for connecting said source of power to said power input circuit whereby, upon said remote sensor having a short between said two output terminals, said current responsive switch means opens to disconnect said source of power from said controller.

2. An improvement in a temperature controller adapted to a control temperature conditioning apparatus, to which is connected a remote sensor adapted to respond to the temperature of a temperature conditioned medium of the temperature conditioning apparatus, said controller having an alternating current power supply circuit connected through a temperature responsive circuit means in the remote sensor to disconnect the power supply circuit if the sensor temperature exceeds a predetermined value, the improvement comprising,
   unidirectional current conducting means mounted in said sensor and connected in said power supply circuit, and
   disconnect circuit means in said controller for disconnecting said power supply circuit when alternating current is supplied to said controller, whereby a shorting out of said remote sensor to bypass said temperature responsive circuit means in said power supply circuit results in an alternating current power supply to operate said disconnect circuit means and render said power supply circuit ineffective.

3. A temperature limiting circuit in the power supply circuit of a temperature controller having a remote medium temperature sensor controlling a temperature conditioning apparatus for supplying conditioned medium to a space,
   a source of alternating current voltage,
   current limiting responsive switch means connected in a first series circuit with a capacitance,
   temperature limiting responsive switch means and a unidirectional current conducting device connected in a second series circuit in said remote sensor, and
   circuit means connecting said source of power in series with said first and second series circuits to provide a pulsating direct current voltage across said capacitance for the power supply to the temperature controller, whereby upon said second series circuit being shorted out to bypass said temperature limiting responsive switch means and said unidirectional current conducting device, an alternating voltage is applied to said capacitance to increase the current through said current responsive switch means to open said power supply circuit to the controller.

4. A temperature controller connected to a remote temperature sensor with a high temperature limit fusible element wherein upon said fusible element opening and the subsequent bypassing of the fusible element in an attempt to operate the controller results in the power supply to the controller being disconnected, and
   a first diode mounted and connected in series with said fusible element, comprising,
   alternating voltage source of power,
   current responsive means opening upon responding to a predetermined current level,
   circuit means including said diode of said sensor and said current responsive means for connecting said source of power to power said controller to furnish current below said predetermined level to the controller, whereby upon bypassing said fusible element and said diode a higher current is supplied to said controller and said current responsive means opens to cut off power to the controller.

5. The invention of claim 4 wherein said circuit means comprises
   a second diode connected to said current responsive means across said source of power, and
   a third diode and capacitance connected in a series circuit in parallel with said second diode whereby, upon said current responsive means opening, power to said controller is terminated.

6. A controller and a remote sensor comprising,
   a first fusible element opening at a predetermined high temperature and a diode connected in a series circuit in the remote sensor, a power supply for a control circuit of the controller comprises a transformer supplying alternating current, second fusible element and a capacitor connected in a series circuit with said remote diode and said first fusible element whereby a direct current voltage across said capacitor provides power to said control circuit, whereby the impedance of said capacitor to pulsating direct current voltage maintains the current through said second fusible element below a predetermined value, so that, upon said remote sensor being bypassed, should said first fusible element be open, an alternating voltage is supplied to said capacitor and its current increases beyond said predetermined value of said second fusible element causing it to open the power circuit to the control circuit.

* * * * *